Patented Mar. 29, 1932

1,851,665

UNITED STATES PATENT OFFICE

CAMILLE DREYFUS, OF NEW YORK, N. Y., AND GEORGE SCHNEIDER, OF CUMBERLAND, MARYLAND, ASSIGNORS TO CELANESE CORPORATION OF AMERICA, A CORPORATION OF DELAWARE

PROCESS OF REDUCING THE VISCOSITY OF CELLULOSE ESTERS

No Drawing.   Application filed July 2, 1926. Serial No. 120,253.

This invention relates to the process for altering the viscosity characteristic of cellulose esters. It is a desideratum in some industries to utilize solutions of cellulose esters of comparatively high concentration. To make the use of such solutions possible it is necessary to treat the cellulose esters so as to reduce their viscosity characteristics, so that the solutions will retain their "thinness" despite the high concentration.

Various methods are known today for reducing the viscosity of cellulose. Among these may be mentioned the following: (1) employing a high maximum temperature of reaction during the formation of the cellulose esters; (2) prolonging the time of reaction; (3) restricting the water used for the hydrolysis of the product; (4) increasing the temperature of the mixture during hydrolysis; and (5) increasing the quantity of condensing agent used. These processes, however, are disadvantageous in that they usually result in an inferior product, also they consume a great deal of time and are costly.

The object of this invention is to provide a simple, economical and expeditious process of altering the viscosity of esters of cellulose. Another object of this invention is to provide a process for lowering the viscosity characteristic of such cellulose esters. Still another object of this invention is to provide a process for lowering the viscosity characteristic of cellulose acetate, thereby increasing its field of usefulness.

We have discovered that the viscosity characteristics of cellulose esters can be quickly and efficiently lowered by treating the cellulose ester, either in the solid suspended state or when in solution, with hydrogen peroxide and iron salts. This treatment not only accelerates the speed with which the lowering of viscosity is accomplished but also permits the viscosity to be lowered to a greater degree than is possible when the ester is treated with hydrogen peroxide alone.

Our process can be carried out in several ways. Thus an acetylation may be affected in an iron vessel and to this acetylation mixture, after the completion of the acetylation, hydrogen peroxide may be added. Or, if desired, the acetylation may be performed in a vessel made of non-active material such as copper, porcelain, glass, etc. and adding to this acetylation mixture iron salts and hydrogen peroxide. Where the acetylation is carried on in a vessel of non-active material it is possible to add the iron salts to the acetylation mixture during the acetylation, adding the hydrogen peroxide only after the acetylation is complete. The iron salts added may be either ferrous or ferric salts. We have found it advantageous to add the ferrous salts since they result in a more rapid and greater reduction in the viscosity of the ester.

The following are examples of carrying out our invention.

*Example 1.*—A solution of cellulose acetate in acetic acid, such as is obtained immediately on the completion of the acetylation in a porcelain vessel, was treated with 25% of a 3% solution of hydrogen peroxide and 0.2% of ferrous acetate. After standing several hours the viscosity of the acetate was considerably reduced as compared with that of the same acetate which was treated with a similar quantity of water. After hydrolysis the cellulose acetate which had been treated with the hydrogen peroxide and ferrous acetate had a viscosity only one fourth that of similar cellulose acetate which had not been so treated.

*Example 2.*—A solution of cellulose acetate in acetic acid, such as obtained immediately upon the completion of acetylation in an iron vessel, was treated with 25% of a 3% solution of hydrogen peroxide. In this example also the cellulose acetate solution, after hydrolysis, was found to have a viscosity one fourth of that of a similar solution prepared from cellulose acetate which had not been treated with hydrogen peroxide.

*Example 3.*—100 parts of cellulose were acetylated in a porcelain vessel with a mixture consisting of 300 parts acetic acid, 400 parts of acetic anhydride and 5 to 15 parts of sulphuric acid containing 0.2 parts of ferrous acetate. On completion of the acetylation 25 parts of hydrogen peroxide (3%) were added to the mixture and the whole allowed to hydrolize. After hydrolysis to the desired solubility in acetone a cellulose acetate was obtained with a viscosity one eighth that of cellulose acetate similarly prepared but to which no ferrous acetate or hydrogen peroxide had been added.

*Example 4.*—A solution of cellulose butyrate in acetic and/or butyric acid as obtained immediately on completion of butylation in an iron vessel, was treated with 20 to 25% of hydrogen peroxide (3%). After hydrolysis the cellulose butyrate was found to have a viscosity one fifth to one third of that of a similar solution of cellulose butyrate which had been treated with a similar amount of water instead of hydrogen peroxide. In this and the preceding examples the percentages given are based on the cellulose originally treated.

The above examples are merely illustrative and point out only a few of the possible methods of carrying out this invention. Results similar to those above pointed out were also obtained when nitrocelluloses, as neutral solids, were treated in accordance with this invention. Also the process is applicable to organic esters other than those indicated in the examples above given. This invention is to be considered as limited only by the scope of the appended claims.

Having described our invention, what we claim is:

1. A process of lowering the viscosity characteristics of cellulose esters which comprises treating such esters with hydrogen peroxide in the presence of iron.

2. A process of lowering the viscosity characteristics of cellulose esters which comprises treating such esters with hydrogen peroxide and iron salts.

3. A process of altering the viscosity characteristics of cellulose esters which comprises treating the esters with an aqueous solution of hydrogen peroxide in the presence of iron salts.

4. A process of treating organic esters of cellulose which comprises subjecting said esters to the action of an aqueous solution of hydrogen peroxide in the presence of iron salts until the viscosity characteristics of the esters are reduced.

5. A process of treating organic esters of cellulose which comprises subjecting said organic esters to the action of an aqueous solution of hydrogen peroxide in the presence of ferrous salts until the viscosity characteristics of the esters are reduced.

6. A process of lowering the viscosity characteristics of cellulose acetate which comprises treating the cellulose acetate with hydrogen peroxide in the presence of iron.

7. A process of lowering the viscosity characteristics of cellulose acetate which comprises treating cellulose acetate with hydrogen peroxide in the presence of iron salts.

8. A process of treating cellulose acetate which comprises subjecting the cellulose acetate to the action of an aqueous solution of hydrogen peroxide in the presence of ferrous salts until a cellulose acetate of the desired viscosity is obtained.

9. A process of treating cellulose acetate which comprises subjecting the cellulose acetate to the action of an aqueous solution of hydrogen peroxide in the presence of ferrous acetate until the viscosity characteristic is reduced to the desired degree.

10. A process of treating cellulose acetate which comprises adding to the cellulose acetate 25% of a solution of hydrogen peroxide (3%) and 0.2% of ferrous acetate and allowing the same to act upon the cellulose acetate until a cellulose acetate of the desired viscosity is obtained.

11. A process of obtaining cellulose acetate with a low viscosity characteristic which comprises acetylizing cellulose in a porcelain vessel by using a mixture of 300 parts of acetic acid, 400 parts of acetic anhydride and 5 to 15 parts of sulphuric acid containing 0.2 parts of ferrous acetate, adding 25 parts of hydrogen peroxide (3%) after the completion of the acetylation and allowing the cellulose acetate to hydrolize.

In testimony whereof, we have hereunto subscribed our names.

CAMILLE DREYFUS.
GEORGE SCHNEIDER.